(12) United States Patent
Croney et al.

(10) Patent No.: US 11,196,748 B1
(45) Date of Patent: Dec. 7, 2021

(54) DIRECTORY PROXY FOR ACCESSING REMOTE DOMAINS

(71) Applicant: Amazon Technologies, Inc., Seattle, WA (US)

(72) Inventors: Keith Littleton Croney, Seattle, WA (US); Ron Cully, Kirkland, WA (US); Nitish Goyal, Bellevue, WA (US); Sachin Sanjay Gujar, Bellevue, WA (US); Brandon Tang, Shoreline, WA (US)

(73) Assignee: Amazon Technologies, Inc., Seattle, WA (US)

( * ) Notice: Subject to any disclaimer, the term of this patent is extended or adjusted under 35 U.S.C. 154(b) by 204 days.

(21) Appl. No.: 16/007,930

(22) Filed: Jun. 13, 2018

(51) Int. Cl.
*H04L 29/06* (2006.01)
*H04L 29/12* (2006.01)

(52) U.S. Cl.
CPC ........ *H04L 63/102* (2013.01); *H04L 61/1511* (2013.01); *H04L 63/08* (2013.01)

(58) Field of Classification Search
CPC ..... H04L 63/102; H04L 61/1511; H04L 63/08
USPC .......................................................... 726/6
See application file for complete search history.

(56) References Cited

U.S. PATENT DOCUMENTS

| | | | | |
|---|---|---|---|---|
| 9,756,012 | B1* | 9/2017 | Pandya | ............... H04L 61/1511 |
| 10,382,445 | B1* | 8/2019 | Mantel | ............... G06F 21/6218 |
| 2005/0228981 | A1* | 10/2005 | Gavrilov | ................ H04L 63/08 |
| | | | | 713/100 |
| 2005/0278384 | A1* | 12/2005 | Lin | .................... H04L 29/12056 |
| 2012/0331292 | A1* | 12/2012 | Haggerty | ............ H04L 63/0272 |
| | | | | 713/168 |
| 2015/0135272 | A1* | 5/2015 | Shah | ....................... H04L 63/08 |
| | | | | 726/4 |
| 2016/0094584 | A1* | 3/2016 | Mehta | ................... G06F 21/604 |
| | | | | 726/1 |

OTHER PUBLICATIONS

Carretero, "Federated Identity Architecture of the European eID System", 2018, IEEE, p. 75302-75326 (Year: 2018).*

* cited by examiner

*Primary Examiner* — David J Pearson
*Assistant Examiner* — Gregory A Lane
(74) *Attorney, Agent, or Firm* — Davis Wright Tremaine LLP

(57) ABSTRACT

A managed directory service obtains a request to generate a first account of a first directory within a first network. In response to the request, the managed directory service creates the first account within the first directory. From the request, the managed directory service also obtains credential information of a second account of a second directory within a second network. The managed directory service updates the first account to include this credential information to enable the first account to be used to access the second directory within the second network.

20 Claims, 7 Drawing Sheets

DIRECTORY PROXY FOR ACCESSING REMOTE DOMAINS

BACKGROUND

Customers of computing resource service providers (often referred to as "cloud providers") often utilize directory services to create and maintain directories for their resources (e.g., file systems, files, users, security policies, network resources, applications, system storage, etc.) for data management and for access to a variety of resources. These directories are often used with on-premises directories to enable on-premises users to access computing resources provided by the computing resource service providers while utilizing their on-premises identities. However, configuring a trust relationship between the directories provided by the computing resource service providers and the on-premises directories to enable users to access these computing resources can be difficult.

BRIEF DESCRIPTION OF THE DRAWINGS

Various techniques will be described with reference to the drawings, in which.

DETAILED DESCRIPTION

Figure 1:
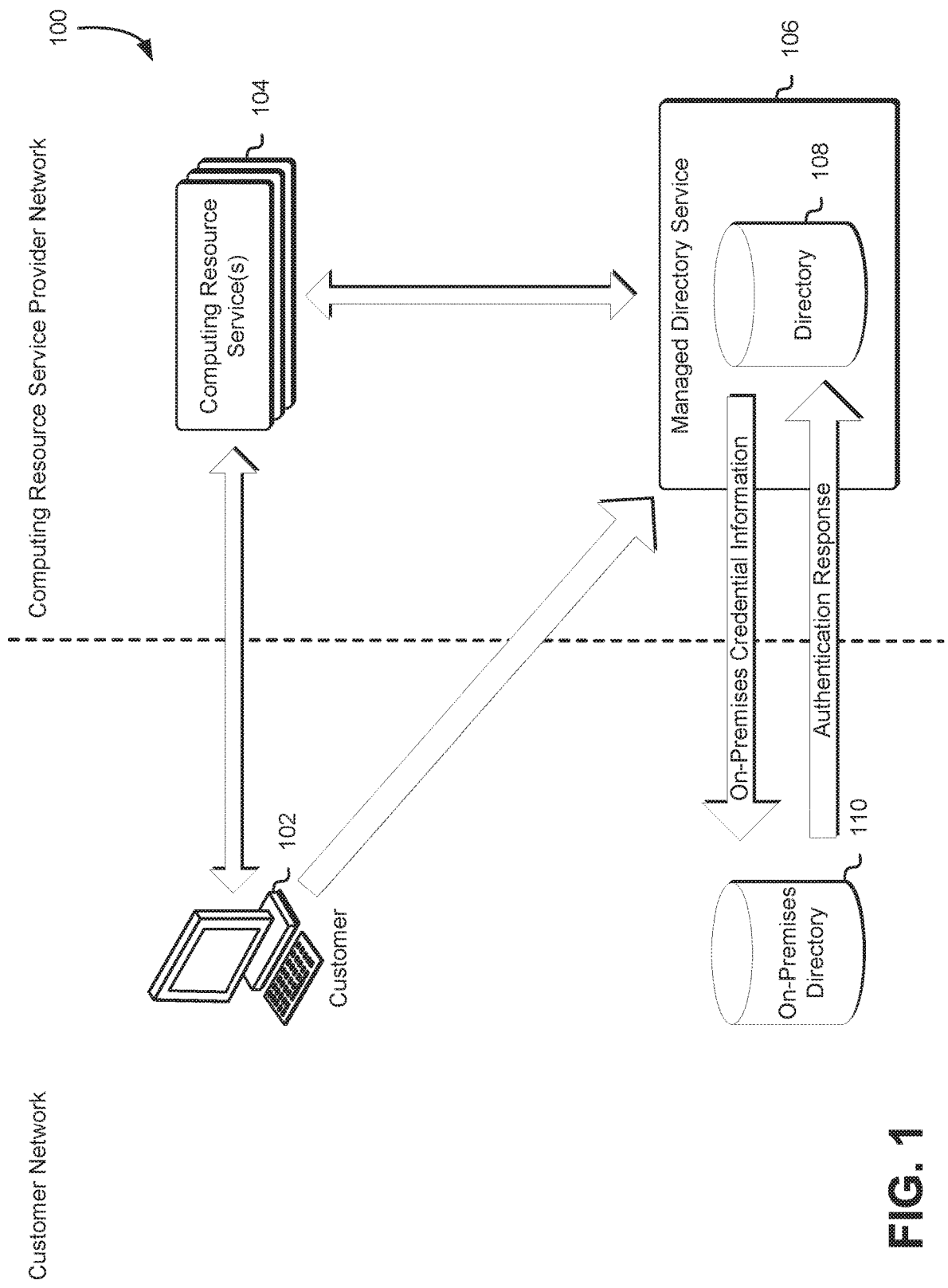
FIG. 1 shows an illustrative example of a system in which various embodiments can be implemented.

Techniques described and suggested herein relate to creating a directory proxy between a directory within a first network and a directory within a second network to enable authentication of requests to access resources of the first network using the directory within the second network. In an embodiment, a customer of a managed directory service transmits a request to the managed directory service to create a service account within a directory maintained by the managed directory service. The service account is usable to configure a proxy through the directory maintained by the managed directory service to a second directory within a remote network (e.g., an on-premises network of the customer, a network different than the network of the managed directory service, etc.). In an embodiment, the customer provides, via the request, a set of credentials to a user account within the second directory. This second directory, in an embodiment, is used to authenticate users of the different network. In an embodiment, the request specifies a domain name corresponding to the customer's domain within the different network, as well as a set of Internet Protocol (IP) addresses corresponding to DNS servers of the customer's domain within the different network. The request can also specify a set of desired credentials for the service account, which can be used to access the service account to change any settings of the proxy.

In an embodiment, in response to the request, a domain controller of the directory maintained by the managed directory service validates the DNS servers of the customer's domain to determine whether the customer has provided valid information for accessing the customer's domain. If the DNS servers specified in the request are validated successfully, the domain controller creates an entry within a remote domains table corresponding to the customer's domain and sets the status of this entry to "creating" to denote that the proxy to a directory of this domain is being created. In an embodiment, the domain controller creates an entry in a managed accounts table of the managed directory service for the pairing between the service account and the customer's domain, as specified in its request. This entry is created to support automated credential rotation for the service account. In an embodiment, the entry also includes a field for the customer's domain or other remote domain to support lookup of the service account credentials in the remote domains table. These credentials are utilized to create a directory token usable for authentication of requests to access resources associated with the directory maintained by the managed directory service.

In an embodiment, the domain controller invokes a workflow on each other domain controller of the directory maintained by the managed directory service to establish the proxy to the directory of the customer's domain. Each domain controller is associated with a DNS server of the directory, which can access the DNS servers of the customer's domain to access the directory within the customer's domain. Through execution of the workflow, each domain controller creates, in each associated DNS server, a conditional forwarder for the customer's domain. In an embodiment, the managed directory service updates programmatic instructions for a domain controller locator to include an entry corresponding to the service account—customer's domain pair. The domain controller locator uses these programmatic instructions to identify the domain controllers of the customer's domain, which are used to access the directory within the customer's domain. Thus, once the programmatic instructions for the domain controller locator have been updated, the managed directory service invokes the domain controller locator to access the customer's domain and identify the domain controllers of the customer's domain. The domain controller locator populates a file usable by the domain controllers of the directory maintained by the managed directory service to identify any available domain controllers of the customer's domain and to establish a connection to the customer's domain via these domain controllers of the customer's domain.

In an embodiment, a set of resources provided by a computing resource service provider are associated with the directory maintained by the managed directory service via the service account. A user submitting a request to access any of these resources provides credential information of the user within the customer's domain or other information usable to authenticate the user within the customer's domain. In response to the request, a conditional forwarder transmits the provided credential information and other information related to the request to a DNS server of the customer's domain. The DNS server of the customer's domain provides the received information to the directory within the customer's domain to determine whether the user can be authenticated. Further, the directory within the customer's domain is used to determine whether the user is authorized to have its request fulfilled to access any of the set of resources provided by the computing resource service provider that are associated with the directory maintained by the managed directory service. An identity management system of the customer's domain generates, based on the identified permissions and the credential information provided by the user, whether the user's request can be fulfilled. The identity management system transmits a response to the managed directory service, which uses this response to determine whether the user's request can be fulfilled.

In an embodiment, a customer can transmit a request to the managed directory service to remove the proxy to the directory of the customer's domain. In response to the request, the managed directory service deletes the corresponding entry in the managed accounts table and invokes a workflow on each domain controller to terminate the proxy to the customer's domain. Further, the managed directory service deletes a corresponding entry from the programmatic instructions for the domain controller locator corresponding to the service account—customer's domain pair. Through the workflow, a domain controller of the directory maintained by the managed directory service deletes a corresponding entry from the remote domains table and invokes the domain controller locator. The domain controller locator executes the programmatic instructions and deletes each conditional forwarder from the DNS servers of the directory maintained by the managed directory service to terminate the proxy.

In the preceding and following description, various techniques are described. For purposes of explanation, specific configurations and details are set forth in order to provide a thorough understanding of possible ways of implementing the techniques. However, it will also be apparent that the techniques described below may be practiced in different configurations without the specific details. Furthermore, well-known features may be omitted or simplified to avoid obscuring the techniques being described.

As one skilled in the art will appreciate in light of this disclosure, certain embodiments may be capable of achieving certain advantages. As an example, the embodiments described in this disclosure enable customers to establish a proxy to their domain directories from a computing resource service provider network without need for establishing a directory trust between their domain directories and directories maintained by a managed directory service. This can remove the need to execute various processes to obtain approval for establishing a directory trust, as the proxy to the customer's domain directories is controlled via a service account, with a set of credentials provided and rotated by the customer as needed. Further, because the proxy is generated using existing managed directory service infrastructure, which leverages the resources of the customer's domain for authentication and authorization purposes, there is no need for any infrastructure changes to enable authentication and authorization of users.

FIG. 1 shows an illustrative example of a system 100 in which various embodiments can be implemented. In the system 100, a customer 102 of a computing resource service provider transmits a request to a managed directory service 106 to create or otherwise provision a service account within a directory 108. In an embodiment, the managed directory service 106 is a computer system that enables customers, through API calls, to remotely manage (e.g., launch, configure, and delete) directories that are hosted on hardware of a computing resource service provider. The computer system may include one or more web servers and application servers, such as described below, configured with executable instructions to enable the servers to perform operations described herein.

This service account, in an embodiment, is used by the managed directory service 106 to establish a proxy to an on-premises directory 110 within a customer network. This customer network is distinct from a computing resource service provider network, where the managed directory service 106 and the directory 108 are implemented. In an embodiment, the managed directory service 106 provides a variety of services to enable computer systems and/or computer system client devices to access system resources including, but not limited to, authentication, authorization and directory services. The managed directory service 106, in one embodiment, provides authentication services which are used to authenticate credentials of a user, computer system, process, automated process or other such entity to at least determine whether that entity is authorized to access the managed directory service 106 and/or the system resources associated with the managed directory service 106. In one embodiment, the credentials are authenticated by the managed directory service 106 itself, or by a process, program, or service under the control of the managed directory service 106, or by a process, program or service that the managed directory service 106 communicates with, or by a combination of these and/or other such services or entities.

In an embodiment, the managed directory service 106 also provides authorization services which are used to authorize a user, computer system, process, automated process or other such entity to at least determine which actions of one or more possible actions that entity is authorized to perform. In the case of a computer system resource such as a file system resource, actions that an entity is or is not authorized to perform include, but are not limited to, creating file systems on the file system resource, destroying file systems on the file system resource, attaching to file systems on the file system resource, detaching from file systems on the file system resource, providing access links to file systems on the file system resource, reclaiming access links to file systems on the file system resource, allowing reads from file systems on the file system resource, allowing writes to file systems on the file system resource and/or other such file system resource actions.

Actions on system resources include, but are not limited to, actions on directories, files, applications, data, databases, links to other resources, system drivers, operating systems, virtual machines and/or other such system resource objects thereon and may include such actions as the actions mentioned herein. Actions to start, stop, reclaim, destroy and/or otherwise manage the system resources as well as other such actions are also included in the available actions. Authorization to perform actions are managed by an entity such as a credentialing or policy system such as a system that maintains a set of credentials and/or policies related to a certain entity and determines, based at least in part on the set of credentials and/or policies which actions an entity is authorized to perform. The actions that an entity is authorized to perform are static or vary according to a number of factors including, but not limited to, time of day, type of credentials, system policies, nature, type or location of the object being accessed or a combination of these and/or other such authorization factors. In one embodiment, a computer system entity is authorized only to read certain files on a file system, to read and write certain other files on a file system, and to add and delete certain other files on a file system. A different computer system entity is authorized to perform any actions on the file system, but only if those actions are initiated from a certain location and at a certain time. In one embodiment, one or more processes are authorized only to write to a file on a file system, such as, for example, a system log, while other processes are only be authorized to read from the file. Other types of operations that are authorized by the managed directory service authorization system and such other types of operations are also considered as being within the scope of the present disclosure.

The managed directory service 106, in an embodiment, also provides directory services which provide an authenticated entity access to computer system resources according to the authorization credentials and/or policies. The directory services are web-based computer systems that host or otherwise provide access to directories. In an embodiment where a computer system entity is authorized to read and write a certain data store on a computer system resource such as a file system resource, the ability to do so is provided by the directory services. Directory services also provide access to the file system resource by providing links to the file system resource locations such as by a Uniform Resource Identifier (URI) object or some other such linkage. The URI is provided by the computer system client device, or by a process running at the data center, or by a process running on a computer system connected to the datacenter, or by the managed directory service 106 or by a combination of these and/or other such computer system entities.

In an embodiment, the customer 102 maintains an on-premises directory 110 within a customer network. Note that management of a directory can include operations related to computing entities different from the directory itself, such as the management of software for interacting with the directory, sometimes referred to as domain controllers and/or directory services. Generally, in the present document reference to a directory, unless otherwise clear from context, refers to software that is part of a system that utilizes the directory where the software may vary depending on the particular implementation being used. In an embodiment, this customer network is distinct from the computing resource service provider network described above, such as by being a distinct private network. The on-premises directory 110 within the customer network can be similar to the directory 108 in that the on-premises directory 110 provides authentication and authorization services within the customer network for users of resources within the customer network. In an embodiment, the customer 102 submits a request (e.g., API call, also referred to as an API request) to the managed directory service 106 to establish a proxy from the directory 108 to the on-premises directory 110 to enable use of the on-premises directory 110 for authentication and authorization of requests (e.g., via a domain controller of the on-premises directory 110) to access resources provided via one or more computing resource services 104 within the computing resource service provider network.

In an embodiment, the managed directory service 106 enables the customer 102 and other entities to submit a request, via an application programming interface (API) call (e.g., "AddRemoteDomain( )"), to establish the proxy to the on-premises directory 110 from the directory 108. This request can specify an identifier corresponding to the directory 108, a DNS name for the on-premises domain within the customer network where the on-premises directory 110 is maintained, Internet Protocol (IP) addresses (which may be IPv4, IPv6, or other addresses) of DNS servers within the on-premises domain, and credential information associated with the service account of the directory 108 usable to access the customer network and the on-premises domain. In an embodiment, the credential information includes a combination of a username and corresponding password. The credential information can also include cryptographic information that is verifiable via the on-premises directory 110. In an embodiment, the managed directory service 106 also enables the customer 102 to request, via another API call (e.g., "ListRemoteDomains( )") information regarding remote domains, such as an on-premises domain, associated with the directory 108. This request can specify an identifier of the directory 108. In response to the request, the managed directory service 106 provides information regarding the status of any connections between the directory 108 and any on-premises directories operating within remote domains. This can include, for each remote domain connection: an identifier of the directory 108, the DNS name of the remote domain, the IP addresses of the DNS servers within the remote domain, the user name associated with the service account, the status of the connection, any supplemental information regarding the status of the connection, and timestamps corresponding to the time at which the status of the connection was updated and to the time at which the connection was established.

In an embodiment, the API input for requesting addition of a remote domain to a service account of the directory 108 is structured as such:
{
   "DirectoryId": "d-1234567890",
   "RemoteDomainName": "remote.example.com",
   "CustomerDNSIps": ["192.168.0.1", "192.168.1.1"],
   "ServiceAccountCredentials": {
   "UserName": "UserName",
   "Password": "Passw@rd"
   }
}
Further, the API input for requesting information regarding remote domains associated with the directory 108 is structured as such:
{"DirectoryId": "d-1234567890"}
The API output from this request, provided by the managed directory service 106 to the customer 102, in an embodiment, is structured as such:
{"RemoteDomains":
   [
   {"DirectoryId": "d-1234567890",
     "RemoteDomainName": "remote.example.com",
     "CustomerDNSIps": ["192.168.0.1", "192.168.1.1"],
     "ServiceAccountUserName": "ajudge99",
     "Status": "Active",
     "StatusReason": " ",
     "StateLastUpdatedDateTime": "28934893489",
     "LastUpdatedDateTime": "28934893489",
     "CreatedDateTime": "28934893489",
   }
   ]
}

In an embodiment, if a service account is added to the directory 108 through the API call for requesting addition of a proxy to a remote domain, a domain controller associated with the directory 108 validates the DNS servers of the remote domain. The domain controller accesses the on-premises domain and determines whether the IP addresses of the DNS servers of the on-premises domain coincide with the IP addresses specified in the request from the customer 102 to add a proxy to the on-premises directory 110 in the remote domain. The domain controller can also determine whether the various Transmission Control Protocol (TCP) and User Datagram Protocol (UDP) ports are open to support DNS operations, Kerberos authentication, Lightweight Directory Access Protocol (LDAP) operations, and the like. In an embodiment, the domain controller also determines whether DNS records exist for the remote domain. If the domain controller is unable to validate the DNS servers of the remote domain, the domain controller returns one or more errors, which the managed directory service 106 provides to the customer 102.

In an embodiment, each domain controller of the directory 108 is implemented on a computer system or abstraction thereof (such as one or more virtual machines operating via a hypervisor), implemented using hardware and software, and can comprise one or more processors and memory that stores executable instructions whose execution by the one or more processors causes the computer system to perform operations described herein. Each domain controller controls access to a private network within the computing resource service provider network and to resources within the directory 108. For instance, a domain controller stores account information of the directory 108 and, accordingly, authenticates users attempting to access the private network and the resources provided therein.

In an embodiment, if the domain controller successfully validates the DNS servers of the remote domain, the domain controller creates an entry in a remote domains table corresponding to the pairing of the directory 108 and the on-premises directory 110 of the remote domain. The remote domains table includes a set of entries, whereby each entry specifies, for the directory 108, information corresponding to the remote domain and the connection to the remote domain. In an embodiment, each entry in the remote domains table specifies: an identifier corresponding to the directory 108, the DNS name of the remote domain, the IP addresses of the DNS servers in the remote domain, the credential information for the customer 102 and/or other users in the remote domain, the status of the service account in the directory 108, any additional information regarding the status of the service account, a timestamp corresponding to when the status was last updated, a timestamp corresponding to when the service account was created, and a timestamp corresponding to when the DNS server IPs for the DNS servers in the remote domain were last updated. In an embodiment, the domain controller further creates an entry in a managed accounts table to enable credential rotation for the service account. The entry includes a field corresponding to the DNS name of the remote domain, which can be used to lookup the service account credentials in the remote domains table. The managed accounts table is utilized to identify credentials of the directory 108 for creation of a directory token usable to access computing resources associated with directory 108. Since the credentials are tied to the service account and, hence, the on-premises directory 110, the entry in the managed accounts table can refer back to the remote domains table via use of the DNS name of the remote domain. In an embodiment, an entry can specify a relationship between credential information for the customer 102 and/or other users and network information corresponding to applicable remote domains. Thus, an entry can specify DNS names of various remote domains, the IP addresses of DNS servers in the various remote domains, and the like that can be accessed using the credential information. This enables use of a single set of credential information for the customer 102 and/or other users to access multiple remote, on-premises, domains of a particular directory forest. A forest, in an embodiment, is a collection of remote domains that inherently trust each other and other security services (e.g., directories) that are located in the forest.

In an embodiment, the domain controller or another component in the system automatically rotates the credential information stored in the remote domains table for each connection to a remote domain. In an embodiment, the domain controller receives a response from an on-premises directory 110 to rotate the credential information utilized to access the remote domain of the on-premises directory 110 (or otherwise detects satisfaction of a set of conditions for credential rotation, such as the passage of a specified amount of time, a command received from a user device of the user, a message received from another system, and/or in other ways). In response, the domain controller generates new credential information that satisfies the requirements of the on-premises directory 110. This can include generating credential information that includes at least one character from a set of characters, that satisfies a length and/or complexity (e.g., entropy) requirement, etc. A password generator (e.g., software with instructions executable to generate a random password that complies with requirements for passwords may be used. The domain controller stores this new credential information in the entry corresponding to the pairing of the directory 108 to the particular remote domain of the on-premises directory 110. Additional information, such as the previous credentials and/or a hash of the previous credentials and/or an encrypted version of the previous credentials may also be stored to be used for various purposes, such as enforcement of credential history requirements. In an embodiment, the domain controller prompts the customer 102 to provide new credential information for accessing the on-premises directory 110 and the remote domain. If the customer 102 provides new credential information, the domain controller provides this new credential information to the on-premises directory 110 to determine whether the new credential information satisfies the requirements of the on-premises directory 110. If the requirements are satisfied, the domain controller updates the corresponding entry in the remote domains table to incorporate this new credential information.

In an embodiment, the domain controller maintains, in the entry corresponding to the pairing of the directory 108 to the remote domain of the on-premises directory 110, a timestamp corresponding to an expiration time for the credential information usable for accessing the remote domain. If the domain controller determines that the credential information is about to expire (e.g., the current time is within a tolerance of the expiration timestamp), the domain controller performs the operations described above to automatically rotate the credential information stored in the remote domains table for the connection to the remote domain. In an embodiment, the domain controller can prompt the customer 102 to provide new credential information for rotation of the credential information. In an embodiment, the domain controller transmits a notification to the customer 102 to indicate that the current credential information is set to expire. This enables the customer 102 to access the service account to update the credential information. In an embodiment, if the domain controller automatically generates new credential information for the remote domain, the domain controller provides this new credential information to the customer 102. The new credential information can be passed to the customer 102 in a secure manner, such as through an encrypted notification.

In an embodiment, the domain controller invokes a workflow which is performed by other domain controllers of the directory 108 to establish the proxy to the remote domain and to the on-premises directory 110. Each domain controller, in an embodiment, creates a conditional forwarder within its corresponding DNS server of the directory 108. A conditional forwarder is implemented on a computer system or abstraction thereof (such as one or more virtual machines operating via a hypervisor), implemented using hardware and software, and can comprise one or more processors and memory that stores executable instructions whose execution by the one or more processors causes the computer system to perform operations described herein. The conditional forwarder transmits authentication and authorization requests from the directory 108 to the on-premises directory 110 via the DNS servers of the directory 108. The conditional forwarder is utilized if a request from the customer 102 or other user to access resources within the computing resource service provider network is to be authenticated and/or authorized via the on-premises directory 110.

In an embodiment, the domain controller updates programmatic instructions for a domain controller locator to include an entry corresponding to the service account—remote domain pair. The domain controller locator is implemented on a computer system or abstraction thereof (such as one or more virtual machines operating via a hypervisor), implemented using hardware and software, and can comprise one or more processors and memory that stores executable instructions whose execution by the one or more processors causes the computer system to perform operations described herein. The domain controller locator uses these programmatic instructions to identify the domain controllers of the remote domain, which are used to access the on-premises directory 110. Thus, once the programmatic instructions for the domain controller locator have been updated, the domain controller invokes the domain controller locator to access the remote domain and identify the domain controllers of the remote domain. The domain controller locator populates a file usable by the domain controllers of the directory 108 to identify any available domain controllers of the remote domain and to establish a connection to the remote domain via these domain controllers of the remote domain.

In an embodiment, each domain controller of the directory 108 updates the state of the remote domain entry in the remote domains table to "Active" to indicate that the proxy to the on-premises directory 110 has been established and is operational. In response to a request from the customer 102 or other user to access a resource associated with the service account of the directory 108, a domain controller of the directory 108 causes a corresponding conditional forwarder to transmit request information to the on-premises directory 110 to obtain an authentication and authorization decision for the request. For example, if the customer 102 submits a request to one or more computing resource services 104 to access a particular resource, the one or more computing resource services 104 transmit credential information and parameters of the request to the managed directory service 106 to authenticate the request and determine whether the customer 102 is authorized to have the request fulfilled.

In an embodiment, a domain controller of the directory 108 transmits, via a conditional forwarder of a DNS server of the directory 108, credential information of the customer 102 or other user to the on-premises directory 110 of the remote domain for authentication. Further, the domain controller provides parameters of the request, which can be used by a computer system or process of the on-premises directory 110 to identify any applicable permissions and determine, based on these applicable permissions, whether the request can be fulfilled. If the customer 102 or other user cannot be authenticated and/or the customer 102 or other user is not authorized to have its request fulfilled, the on-premises directory 110, through a computer system, provides a response to the directory 108 that the request is to be denied. The directory 108, via a computer system, provides a response to the computing resource service 104 to indicate that the request is to be denied. Alternatively, if the on-premises directory 110 determines, via computer system, that the customer 102 or other user is authenticated and that it is authorized to have its request fulfilled, the computer system transmits a response to the directory 108 to indicate the request can be fulfilled. This can cause the computing resource service 104 to fulfill the request in accordance with any permissions from the on-premises directory 110.

In an embodiment, the managed directory service 106 enables the customer 102 and other entities to submit a request, via an API call (e.g., "UpdateRemoteDomain( )"), to update credential information for the service account of the directory 108 or update the remote domain DNS server IP addresses. If the request indicates that the credential information of the service account is to be updated, the domain controller of the directory 108 performs authentication of the customer 102 using the original set of credentials. If successful, the domain controller updates the credential information in the corresponding entry in the remote domains table. Alternatively, if the request indicates that the IP addresses of the DNS servers of the remote domain are to be updated, the domain controller validates the DNS servers of the remote domain (as described above) and makes a synchronous call to the data plane to remove the existing conditional forwarders. The domain controller invokes the workflow described above to create new conditional forwarders for the directory 108 and enable communication through the DNS servers of the directory 108 to the remote domain.

In an embodiment, the API input for requesting an update of a remote domain to a service account of the directory 108 is structured as such for updating the IP addresses of the DNS servers:
{"DirectoryId": "d-1234567890",
  "RemoteDomainName": "remote.example.com",
  "CustomerDNSIps": ["192.168.0.1", "192.168.1.1"]
}
Further, the API input for requesting an update of a remote domain to a service account of the directory 108 is structured as such for updating the credential information of the service account:
{"DirectoryId": "d-1234567890",
  "RemoteDomainName": "remote.example.com",
  "ServiceAccountCredentials": {
  "UserName": "ajudge99",
  "Password": "Passw@rd"
  }
}
In an embodiment, the managed directory service 106 enables the customer 102 to submit a request, via an API call (e.g., "RemoveRemoteDomain( )"), to delete the service account from the directory 108 and terminate the proxy to the on-premises directory 110. The request can specify an identifier of the directory 108 and the DNS name of the remote domain. In response to the request, the domain controller of the directory 108 deletes the corresponding entry in the managed accounts table to disable credential rotation. Further, the domain controller invokes a workflow on each other domain controller of the directory 108 to remove the proxy to this remote domain. This workflow involves removing the remote domain from the programmatic instructions for the domain controller locator and invoking the domain controller locator to cause the domain controller locator to terminate the connections between the domain controllers of the directory 108 and the remote domain. Further, as part of the workflow, the domain controllers delete their corresponding conditional forwarders from the DNS servers of the directory 108.

Figure 2:
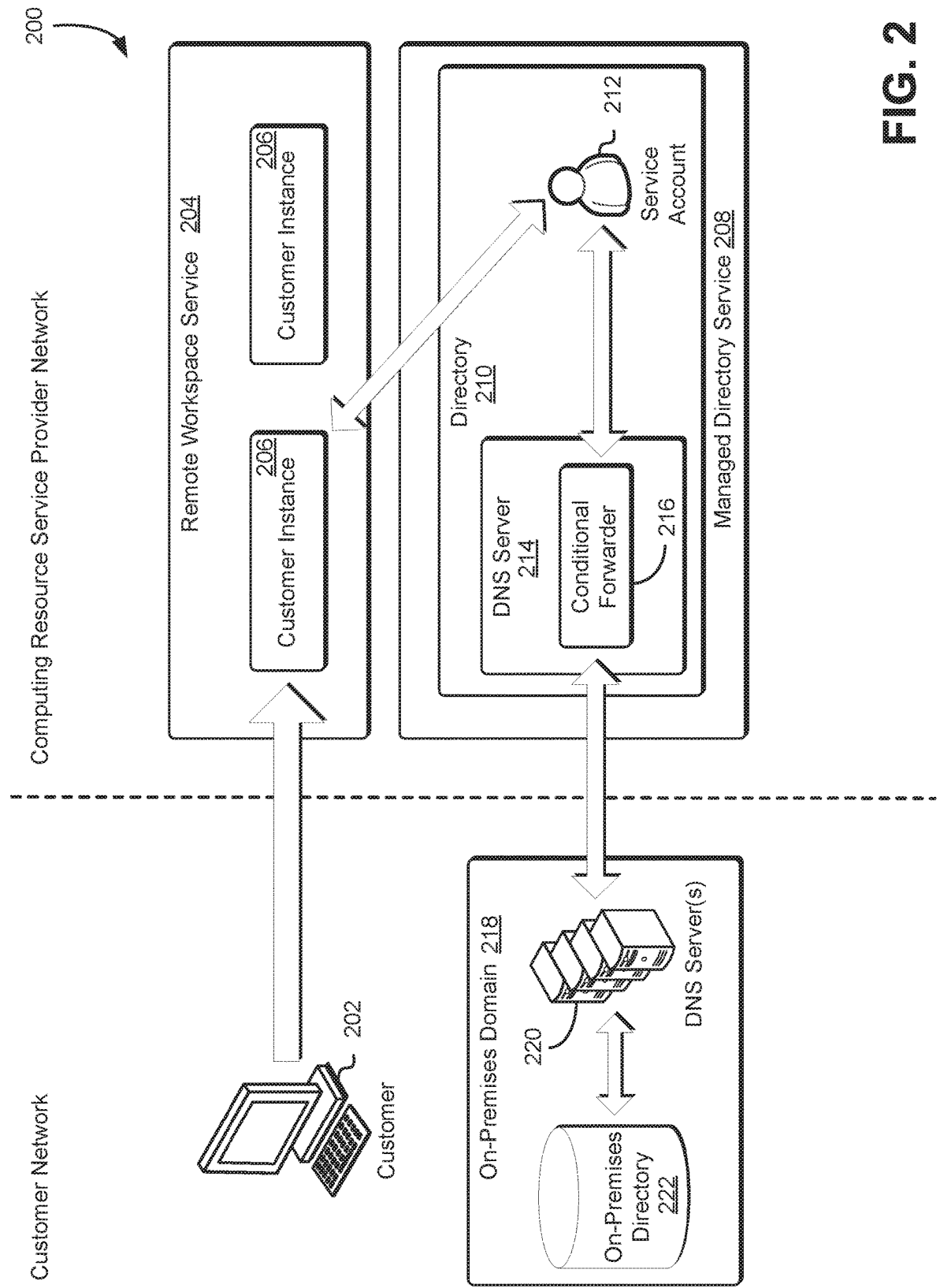
FIG. 2 shows an illustrative example of a system in which a conditional forwarder obtains an authentication decision from an on-premises directory in response to a request to access a computing resource of a computing resource service provider network in accordance with at least one embodiment.

FIG. 2 shows an illustrative example of a system 200 in which a conditional forwarder 216 obtains an authentication decision from an on-premises directory 222 in response to a request to access a computing resource of a computing resource service provider network in accordance with at least one embodiment. In the system 200, a customer 202 transmits a request to a remote workspace service 204 to access resources within an on-premises domain 218 through a customer instance 206. The remote workspace service 204 is a computer system, collection of computer systems, servers, applications, and/or processes of a computing resource service provider that provides virtual operating systems and desktops to customers. These virtual operating systems and desktops are implemented using one or more virtual computing instances, such as the customer instances 206 illustrated in FIG. 2. In an embodiment, in response to the customer 202 request, the customer instance 206 transmits the request, along with credential information of the customer 202, to the managed directory service 208. It should be noted that while a remote workspace service 204 and customer instances 206 are described for the purpose of illustration, other resources and computing resource service can leverage the managed directory service 208 and directories maintained within to manage access to resources within an on-premises domain 218.

In an embodiment, the customer instance 206 submits an API request (e.g., "GetDirectoryToken( )" etc.) to the managed directory service 208 to obtain a directory token from the on-premises domain 218 that is usable to access resources associated with the customer instance 206. The request specifies credential information of the customer 202, including credential information of the customer 202 and a realm parameter usable to identify the on-premises domain 218 that is to be accessed for fulfillment of the request. In response to the request, the managed directory service 208 identifies the corresponding service account 212 of the directory 210. Further, the managed directory service 208 queries the remote domains table to retrieve the service account credentials for the on-premises directory 222. In an embodiment, the managed directory service 208, through the directory 210, determines whether the customer 202 is authorized to access the on-premises domain 218. The request from the customer 202 can specify a set of credentials of the service account 212, which are verified to determine whether to proceed with the connection to the on-premises domain 218. Thus, if the customer 202 cannot be authenticated by the managed directory service 208, the customer's request is denied, as access to the on-premises domain 218 is not performed.

In an embodiment, if the customer 202 is authenticated by the managed directory service 208 through the service account 212 of the directory 210, the managed directory service 208, through the service account 212, utilizes a conditional forwarder 216 of a DNS server 214 of the directory 210 to transmit the customer 202 request to the on-premises domain 218. The managed directory service 208 queries the remote domains table to retrieve the service account credentials for the on-premises directory 222 within the on-premises domain 218. The managed directory service 208 provides these credentials, along with the other parameters of the customer 202 request to the conditional forwarder 216 of the DNS server 214 of the directory 210. As noted above, the conditional forwarder causes authentication requests, authorization requests, and/or other directory requests to be transmitted from the directory 210 to the on-premises directory 222 via the DNS servers 214 of the directory 210. The conditional forwarder is utilized if a request from the customer 202 or other user to access resources within the computing resource service provider network requires authentication and authorization via the on-premises directory 222.

In an embodiment, a domain controller of the directory 210 transmits, via the conditional forwarder 216 of the DNS server 214 of the directory 210, credential information of the customer 202 to the on-premises directory 222 of the on-premises domain 218 for authentication. Further, the domain controller provides parameters of the request, which can be used by a computer system or process of the on-premises directory 222 to identify any applicable permissions and determine, based on these applicable permissions, whether the request can be fulfilled. The conditional forwarder 216 obtains, from the remote domains table, the IP addresses of the DNS servers 220 of the on-premises domain 218. The credential information and the parameters of the customer 202 request are transmitted to the on-premises domain 218 via these DNS servers 220. The DNS servers 220 transmit the received information to the on-premises directory 222 for processing.

In an embodiment, a computer system of the on-premises directory 222 evaluates the service account credential information provided by the conditional forwarder 216 to determine if the credential information is valid. If the provided credential information is not valid, the on-premises directory 222 provides an authentication response, through the DNS servers 220, to the directory 210 to indicate that the customer 202 could not be authenticated successfully. This causes the directory 210 to provide a response to the customer instance 206 to indicate that the customer 202 request should be denied. However, if the provided credential information is validated, the on-premises directory 222 identifies one or more permissions applicable to the request from the customer 202. In an embodiment, a permission (e.g., access control policy or "policy," as described herein) specifies a principal, a resource, an action, a condition, and an effect. In some embodiments, a permission can also specify a plurality of one or more of these elements such as, for example, a set or class of users, a collection of resources, several different actions, and/or multiple conditions. The principal may be a user, a group, an organization, a role, or a collection and/or combination of these or other such entities. A principal may be any entity that is capable of submitting API calls that cause an action associated with a resource to be performed and/or any entity to which permissions associated with a resource may be granted.

The resource may refer to a computing resource of a computing resource service provider. Computing resources of a computing resource service provider may include: compute resources (e.g., virtual machine instances); storage resources (e.g., scalable storage, block storage, and managed file storage systems); database systems (e.g., managed relational database systems); migration services (e.g., applications, services, and hardware for streamlining the transfer of data from one physical data center to another); network and content delivery; developer tools; management tools; security, identity, and access management services; analytics services; artificial intelligence services; and more. Computing resources may be organized in a hierarchy, and may use structures such as folders, directories, buckets, etc. to organize sets of computing resources into groupings. In some cases, policies and/or permissions may be applied directly to a bucket and grant cross-account access to an environment.

The action may be the specific action or actions that will be allowed or denied by the permission. Different types of services (e.g., having different service namespaces) may support different actions. For example, an identity and account management service may support an action for changing passwords, and a storage service may support an action for deleting objects. An action may be performed in association with the resource and may, for example, be identified by a type of API call, a library call, a program, process, series of steps, a workflow, or some other such action.

An effect may refer to whether the permission is used to grant or deny access to the computing resources specified in the permission in the resource element. An effect may be an ALLOW effect, which grants access to a resource, and a DENY effect, which denies access to a resource. In some embodiments, access to computing resources of a computing resource service provider are denied by default and a permission affirmatively including an ALLOW effect is required.

In an embodiment, the on-premises directory 222 determines, based on the identified permissions applicable to the request, whether the request can be fulfilled. In an embodiment, the on-premises directory 222 adheres to a principle of the most restrictive privilege granting with regard to any request for which these permissions are applicable. Thus, the on-premises directory 222 may evaluate the permissions to identify the most restrictive privileges applicable to the request. If the on-premises directory 222 determines that, based on the permissions, that the request cannot be fulfilled, the on-premises directory 222 provides an authorization response, through the DNS servers 220, to the directory 210 to indicate that the request should not be fulfilled due to the customer 202 not having the requisite permissions to enable fulfillment of its request. This causes the directory 210 to provide a response to the customer instance 206 to indicate that the customer 202 request should be denied. In an embodiment, the on-premises directory 222 provides the applicable permissions to the directory 210, which can determine whether the request can be fulfilled based on the applicable permissions. Thus, the directory 210 can generate the authorization decision rather than the on-premises directory 222.

In an embodiment, if the on-premises directory 222 determines that the customer 202 is authenticated and that the applicable permissions enable fulfillment of the request, the on-premises directory transmits a response to the directory 210 to indicate the request can be fulfilled. This causes the directory 210, through the service account 212, to transmit a response to the customer instance 206 to indicate that the request from the customer 202 can be fulfilled. In an embodiment, the directory 210 provides the permissions applicable to the request to the customer instance 206. This causes the customer instance 206 to fulfill the request in accordance with the identified permissions from the on-premises directory 222 of the on-premises domain 218.

Figure 3:
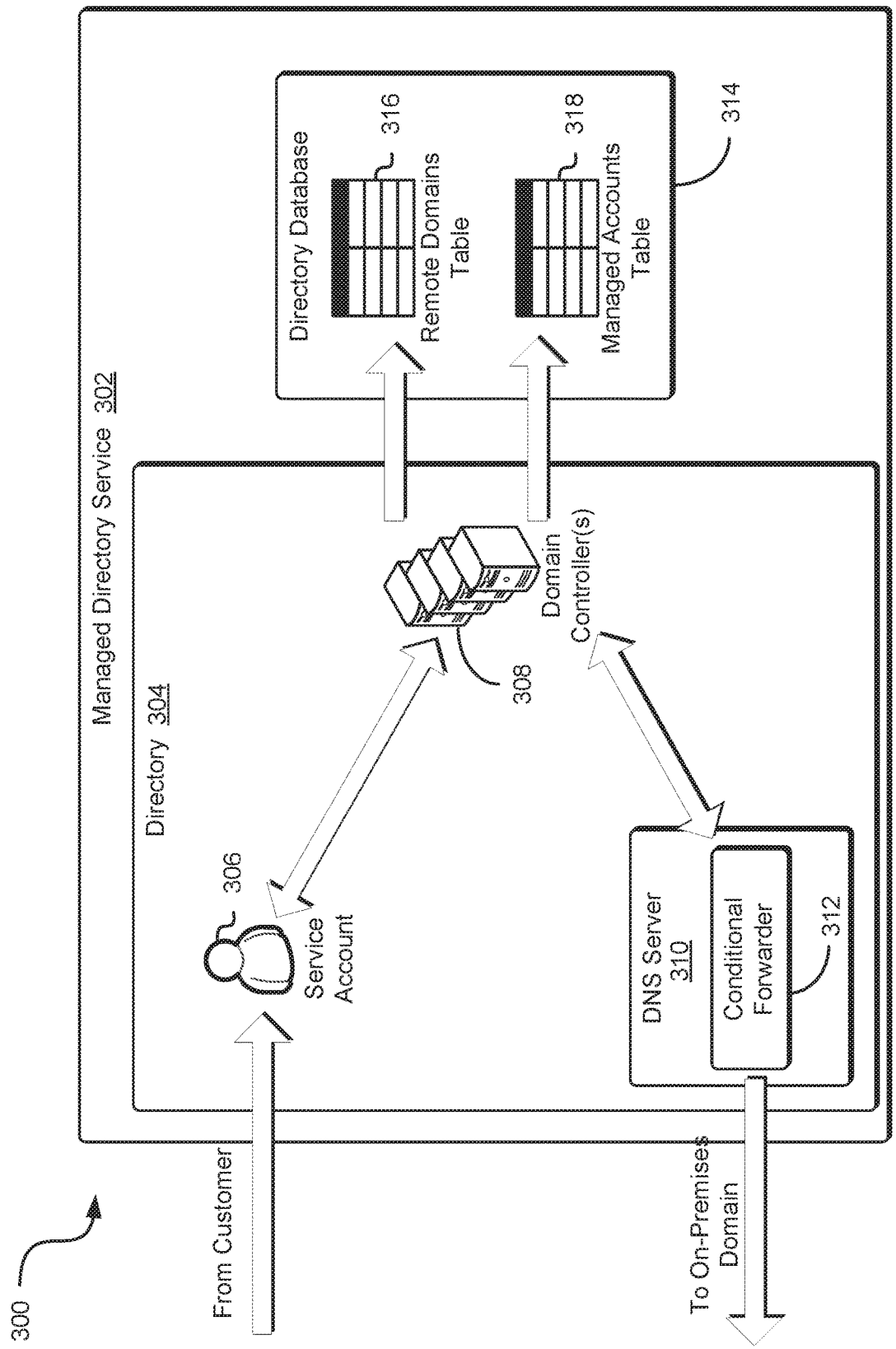
FIG. 3 shows an illustrative example of a system in which a conditional forwarder is created for each Domain Name System (DNS) server of a directory to enable authentication using an on-premises directory in an on-premises domain in accordance with at least one embodiment.

FIG. 3 shows an illustrative example of a system 300 in which a conditional forwarder 312 is created for each DNS server 310 of a directory 304 to enable authentication using an on-premises directory in an on-premises domain in accordance with at least one embodiment. In the system 300, a customer of a computing resource service provider transmits a request to a managed directory service 302 to create a service account 306 within a directory 304. This service account 306, in an embodiment, is used by the managed directory service 302 to establish a proxy to an on-premises directory within an on-premises domain. In an embodiment, the managed directory service 302 enables the customer and other entities to submit a request, via an API call, to establish the proxy to the on-premises directory from the directory 304. This request can specify an identifier corresponding to the directory 304, a DNS name for the on-premises domain where the on-premises directory is maintained, IP addresses of DNS servers within the on-premises domain, and credential information associated with the service account 306 of the directory 304 usable to access the on-premises domain. In an embodiment, the credential information includes a combination of a username and corresponding password. The credential information can also include cryptographic information that is verifiable via the on-premises directory.

In an embodiment, if a service account 306 is added to the directory 304 through the API call for requesting addition of a proxy to a remote domain, a domain controller 308 associated with the directory 304 validates the DNS servers of the remote domain. The domain controller accesses, via a DNS server 310 of the directory 304, the on-premises domain and determines whether the IP addresses of the DNS servers of the on-premises domain coincide with the IP addresses specified in the request from the customer to add a proxy to the on-premises directory in the on-premises domain. The domain controller can also determine whether the various TCP and UDP ports are open within the on-premises DNS servers to support DNS operations, Kerberos authentication, LDAP operations, and the like. In an embodiment, the domain controller 308 also determines whether DNS records exist for the on-premises domain. If the domain controller 308 is unable to validate the DNS servers of the on-premises domain, the domain controller 308 returns one or more errors, which the managed directory service 302 provides to the customer.

In an embodiment, if the domain controller 308 successfully validates the DNS servers of the on-premises domain, the domain controller 308 creates an entry in a remote domains table 316 corresponding to the pairing of the directory 304 and the on-premises directory of the on-premises domain. The remote domains table 316 includes a set of entries, whereby each entry specifies, for the directory 304, information corresponding to the on-premises domain and the connection to the on-premises domain. In an embodiment, the domain controller 308 further creates an entry in a managed accounts table 318 to enable credential rotation for the service account 306. The entry includes a field corresponding to the DNS name of the remote domain, which can be used to lookup the service account credentials in the remote domains table 316. The managed accounts table 318 is utilized to identify credentials of the directory 304 for creation of a directory token usable to access computing resources associated with directory 304. Since the credentials are tied to the service account and, hence, the on-premises directory, the entry in the managed accounts table 318 can refer back to the remote domains table 316 via use of the DNS name of the on-premises domain. In an embodiment, the remote domains table 316 and the managed accounts table 318 are maintained in a directory database 314 of the managed directory service 302. In an embodiment, an entry can specify a relationship between credential information for the customer and/or other users and network information corresponding to applicable remote domains. Thus, an entry can specify DNS names of various remote domains, the IP addresses of DNS servers in the various remote domains, and the like. This enables use of a single set of credential information for the customer and/or other users to access multiple remote, on-premises domains.

In an embodiment, the domain controller 308 invokes a workflow which is performed by other domain controllers 308 of the directory 304 to establish the proxy to the on-premises domain and to the on-premises directory. Each domain controller 308, in an embodiment, creates a conditional forwarder 312 within its corresponding DNS server 310 of the directory 304. The conditional forwarder 312 transmits authentication and authorization requests from the directory 304 to the on-premises directory via the DNS servers 310 of the directory 304. The conditional forwarder 312 is utilized if a request from the customer or other user to access resources within the computing resource service provider network requires authentication and authorization via the on-premises directory.

In an embodiment, the domain controller 308 updates programmatic instructions for a domain controller locator to include an entry corresponding to the service account—remote domain pair. The domain controller locator uses these programmatic instructions to identify the domain controllers of the on-premises domain, which are used to access the on-premises directory. Thus, once the programmatic instructions for the domain controller locator have been updated, the domain controller 308 invokes the domain controller locator to access the on-premises domain and identify the domain controllers of the on-premises domain. The domain controller locator populates a file usable by the domain controllers 308 of the directory 304 to identify any available domain controllers of the remote domain and to establish a connection to the remote domain via these domain controllers of the remote domain.

In an embodiment, each domain controller 308 of the directory 304 updates the state of the on-premises domain entry in the remote domains table 316 to "Active" to indicate that the proxy to the on-premises directory has been established. In response to a request from the customer or other user to access a resource associated with the service account 306 of the directory 304, a domain controller 308 of the directory 304 causes a corresponding conditional forwarder 312 to transmit request information to the on-premises directory to obtain an authentication and authorization decision for the request.

Figure 4:
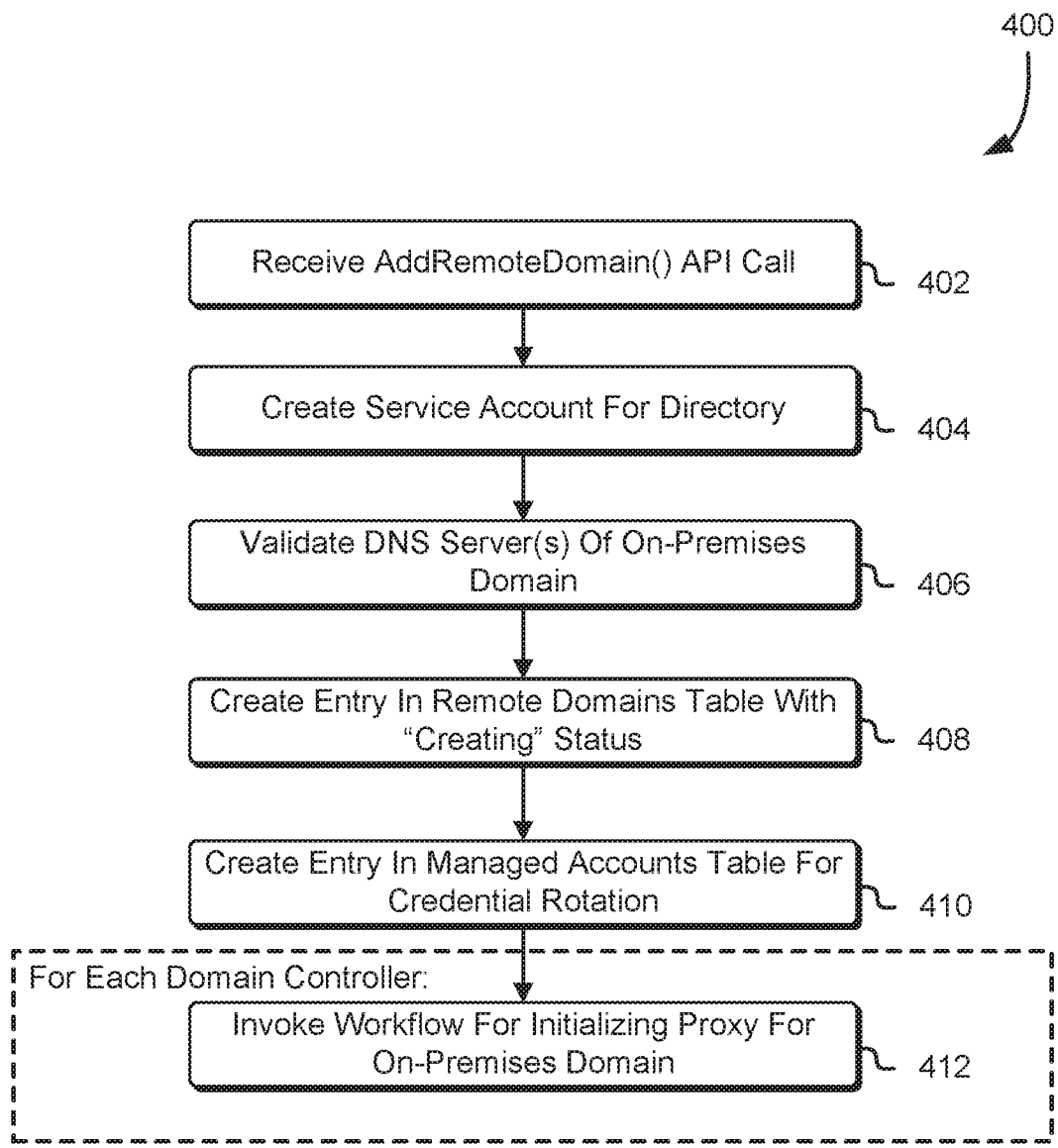
FIG. 4 shows an illustrative example of a process for adding a service account to a directory to enable creation of a proxy through the directory to an on-premises directory within an on-premises domain in accordance with at least one embodiment.

FIG. 4 shows an illustrative example of a process 400 for adding a service account to a directory to enable creation of a proxy through the directory to an on-premises directory within an on-premises domain in accordance with at least one embodiment. Operations of the process 400 are performed by a managed directory service in conjunction with a domain controller of the directory in which the service account is created and where the proxy to the on-premises domain is to be established. The process 400 can also be performed by a computer system or abstraction thereof (such as one or more virtual machines operating via a hypervisor), implemented using hardware and software, and can comprise one or more processors and memory that stores executable instructions whose execution by the one or more processors causes the computer system to perform the operations of the managed directory service and the domain controller of the directory wherein the proxy is to be established.

In an embodiment, the managed directory service receives 402 (or otherwise obtains) an "AddRemoteDomain( )" API call to create a service account and establish a proxy to an on-premises directory. A web server of the managed directory service, for instance, may receive the API call. This request can specify an identifier corresponding to the directory maintained by the managed directory service, a DNS name for the on-premises domain within the customer network where the on-premises directory is maintained, IP addresses of DNS servers within the on-premises domain, and credential information associated with the service account of the directory usable to access the customer network and the on-premises domain.

In an embodiment, in response to the request, the managed directory service creates 404 a service account for the directory specified in the API call. The service account serves as the basis for the proxy to the on-premises domain and the on-premises directory usable for authentication of user requests and for determining authorization of fulfillment of such user requests. The service account can maintain a plurality of identities corresponding to identities on the on-premises directory. Thus, requests directed to the service account serve as an indication that authentication and authorization processes are to be performed using the on-premises directory via the established proxy to the on-premises domain.

In an embodiment, the managed directory service, through a domain controller of the directory, validates 406 the one or more DNS servers of the on-premises domain specified by the customer in its request. The domain controller accesses the on-premises domain and determines whether the IP addresses of the DNS servers of the on-premises domain coincide with the IP addresses specified in the request from the customer to add a proxy to the on-premises directory in the on-premises domain. The domain controller can also determine whether the various TCP and UDP ports are open to support DNS operations, Kerberos authentication, LDAP operations, and the like. In an embodiment, the domain controller also determines whether DNS records exist for the remote domain. If the domain controller is unable to validate the DNS servers of the remote domain, the domain controller returns one or more errors, which the managed directory service provides to the customer.

In an embodiment, if the DNS servers specified in the request are validated successfully, the domain controller creates 408 an entry within a remote domains table corresponding to the on-premises domain and sets the status of this entry to "creating" to denote that the proxy to the directory of this domain is being created. In an embodiment, the domain controller also creates 410 an entry in a managed accounts table of the managed directory service for the pairing between the service account and the on-premises domain, as specified in the customer's request. This entry is created to support automated credential rotation for the service account. In an embodiment, the entry also includes a field for the on-premises domain or other remote domain to support lookup of the service account credentials in the remote domains table. These credentials are utilized to create a directory token usable for authentication of requests to access resources associated with the directory maintained by the managed directory service.

In an embodiment, the domain controller invokes 412, for each other domain controller of the directory maintained by the managed directory service, a workflow for initializing the proxy for the on-premises domain. Each domain controller is associated with a DNS server of the directory, which can access the DNS servers of the on-premises domain to access the directory within the on-premises domain. Through execution of the workflow, each domain controller creates, in each associated DNS server, a conditional forwarder for the on-premises domain. The conditional forwarder transmits authentication and authorization requests from the directory 304 to the on-premises directory via the DNS servers of the directory. The conditional forwarder is utilized if a request from the customer or other user to access resources within the computing resource service provider network requires authentication and authorization via the on-premises directory.

Figure 5:
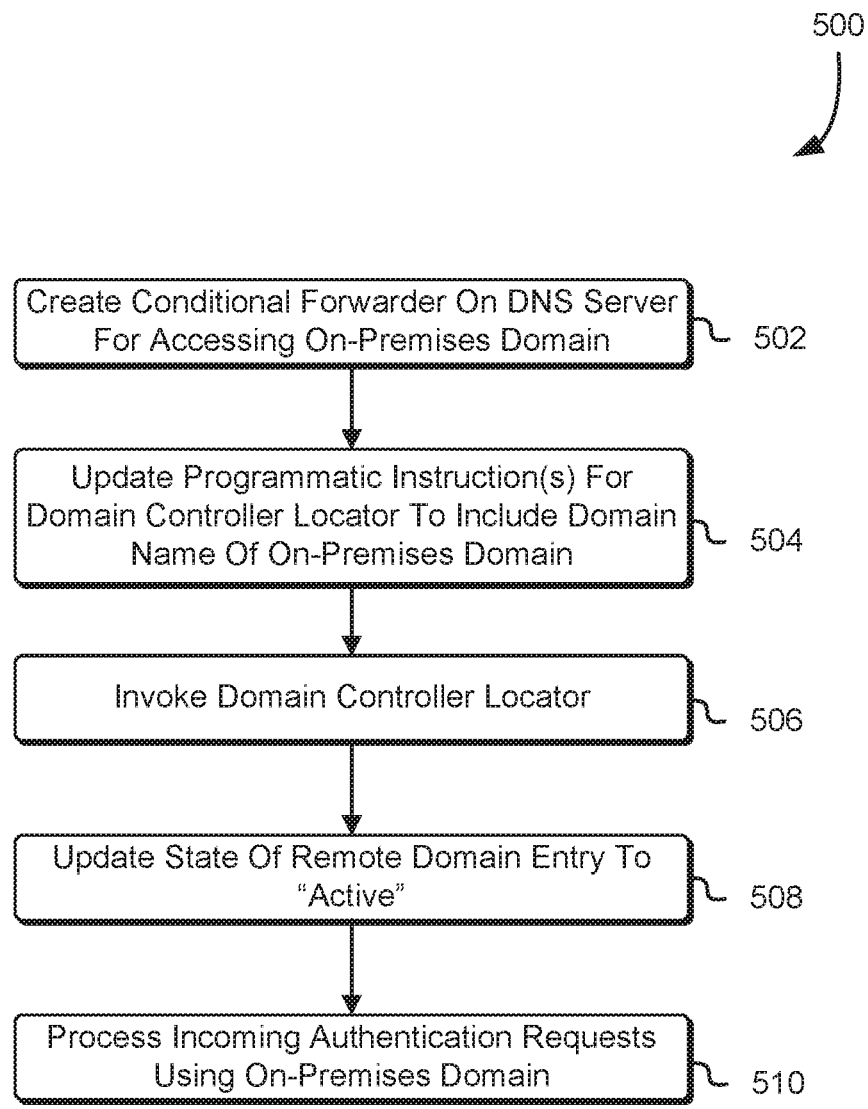
FIG. 5 shows an illustrative example of a process for generating a conditional forwarder for each DNS server to enable requests to access a resource through a directory to be authenticated via an on-premises domain in accordance with at least one embodiment.

FIG. 5 shows an illustrative example of a process 500 for generating a conditional forwarder for each DNS server to enable requests to access a resource through a directory to be authenticated via an on-premises domain in accordance with at least one embodiment. Operations of the process 500 are performed by a domain controller of a directory maintained by the managed directory service. The process 500 can also be performed by a computer system or abstraction thereof (such as one or more virtual machines operating via a hypervisor), implemented using hardware and software, and can comprise one or more processors and memory that stores executable instructions whose execution by the one or more processors causes the computer system to perform the operations of the domain controller of the directory wherein the proxy is to be established.

In an embodiment, each domain controller of the directory creates 502 a conditional forwarder in its corresponding DNS server for accessing the on-premises domain. As noted above, a conditional forwarder is implemented on a computer system or abstraction thereof (such as one or more virtual machines operating via a hypervisor), implemented using hardware and software, and can comprise one or more processors and memory that stores executable instructions whose execution by the one or more processors causes the computer system to perform operations described herein. The conditional forwarder transmits authentication and authorization requests from the directory to the on-premises directory via the DNS servers of the directory. The conditional forwarder is utilized if a request from the customer or other user to access resources within the computing resource service provider network requires authentication and authorization via the on-premises directory.

In an embodiment, the domain controller updates 504 the one or more programmatic instructions of a domain controller locator to include the domain name of the on-premises domain. This domain name is provided by the customer in its request to establish the proxy to the directory in the on-premises domain. The domain controller updates these programmatic instructions for the domain controller locator to include an entry corresponding to the service account—remote domain pair. The domain controller locator uses these programmatic instructions to identify the domain controllers of the on-premises domain, which are used to access the on-premises directory. Thus, once the programmatic instructions for the domain controller locator have been updated, the domain controller invokes 506 the domain controller locator to access the on-premises domain and identify the domain controllers of the on-premises domain. The domain controller locator populates a file usable by the domain controllers of the directory to identify any available domain controllers of the on-premises domain and to establish a connection to the on-premises domain via these domain controllers of the remote domain.

In an embodiment, the domain controller updates 508 the state of the remote domain entry in the remote domains table to "Active." This entry is set to "Active" to indicate that the proxy to the on-premises directory has been established and is operational. In response to a request from the customer or other user to access a resource associated with the service account of the directory, a domain controller of the directory causes a corresponding conditional forwarder to transmit request information to the on-premises directory to obtain an authentication and authorization decision for the request. For example, if the customer submits a request to one or more computing resource services to access a particular resource, the one or more computing resource services transmit credential information and parameters of the request to the managed directory service to authenticate the request and determine whether the customer is authorized to have the request fulfilled. Thus, the domain controller can process 510 incoming authentication and authorization requests using the on-premises directory within the on-premises domain.

Figure 6:
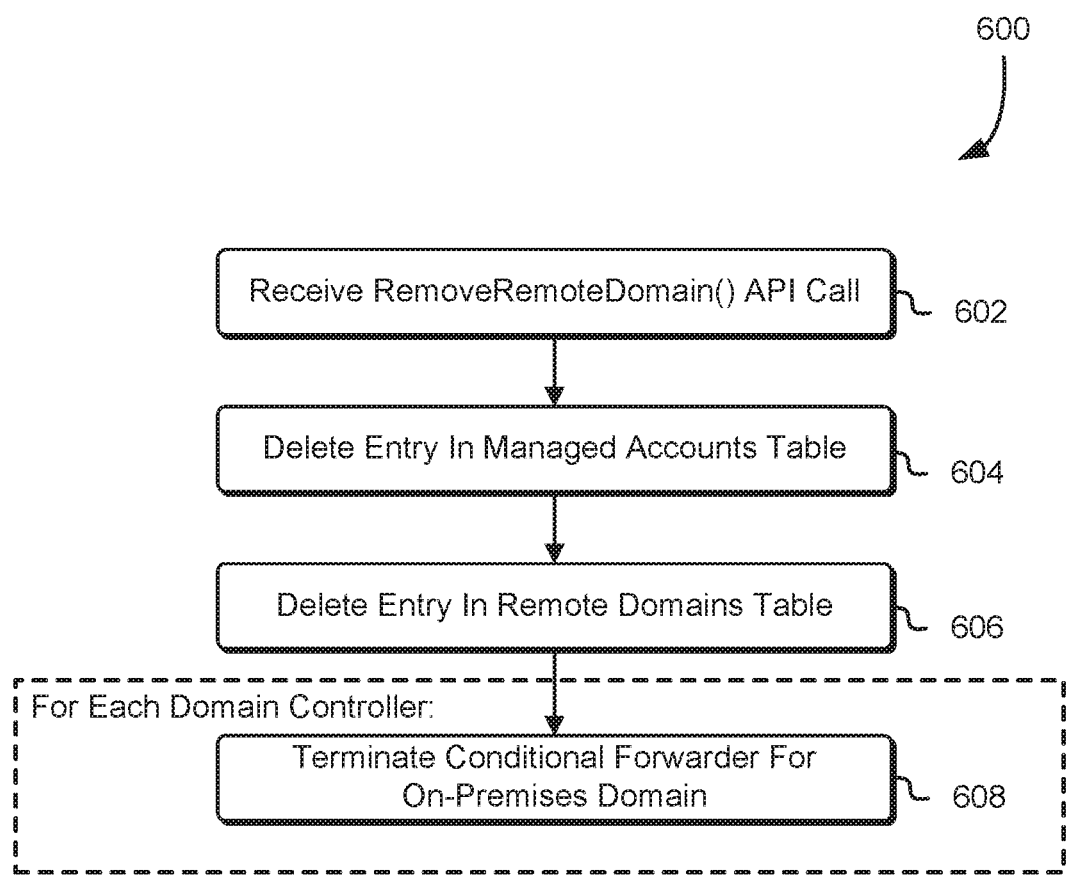
FIG. 6 shows an illustrative example of a process for terminating a proxy through a directory to an on-premises directory within an on-premises domain in accordance with at least one embodiment.

FIG. 6 shows an illustrative example of a process 600 for terminating a proxy through a directory to an on-premises directory within an on-premises domain in accordance with at least one embodiment. Operations of the process 600 are performed by a managed directory service in conjunction with a domain controller of the directory in which the service account is maintained and where the proxy to the on-premises domain is to be removed. The process 600 can also be performed by a computer system or abstraction thereof (such as one or more virtual machines operating via a hypervisor), implemented using hardware and software, and can comprise one or more processors and memory that stores executable instructions whose execution by the one or more processors causes the computer system to perform the operations of the managed directory service and the domain controller of the directory wherein the proxy is to be removed.

In an embodiment, the managed directory service enables the customer to submit a request, via an API call (e.g., "RemoveRemoteDomain( )"), to delete the service account from the directory and terminate the proxy to the on-premises directory. The request can specify an identifier of the directory and the DNS name of the remote domain. Thus, the managed directory service receives 602 (or otherwise obtains) a "RemoveRemoteDomain( )" API call to terminate the proxy to the on-premises directory and delete the service account corresponding to this proxy from the directory maintained by the managed directory service.

In an embodiment, in response to the request, the domain controller of the directory deletes 604 the corresponding entry in the managed accounts table to disable credential rotation. Further, the domain controller deletes 606, from the remote domains table, the corresponding entry for the service account—remote domain pair. In an embodiment, the domain controller invokes a workflow on each domain controller of the directory to terminate the proxy to the on-premises domain and the on-premises directory. This workflow causes each domain controller to terminate 608 the conditional forwarder for the on-premises domain in each of the corresponding DNS servers of the directory maintained by the managed directory service.

In an embodiment, the workflow causes each domain controller of the directory to remove, from the programmatic instructions of the domain controller locator, an entry corresponding to the on-premises domain. The domain controller invokes the domain controller locator, which executes the programmatic instructions. Since the on-premises domain entry has been removed from the programmatic instructions and the entry corresponding to the service account—remote domain pair has been removed from the remote domains table, the domain controller locator terminates the connections between the DNS servers and the domain controllers of the on-premises domain. This results in the proxy to the on-premises domain being terminated.

Figure 7:
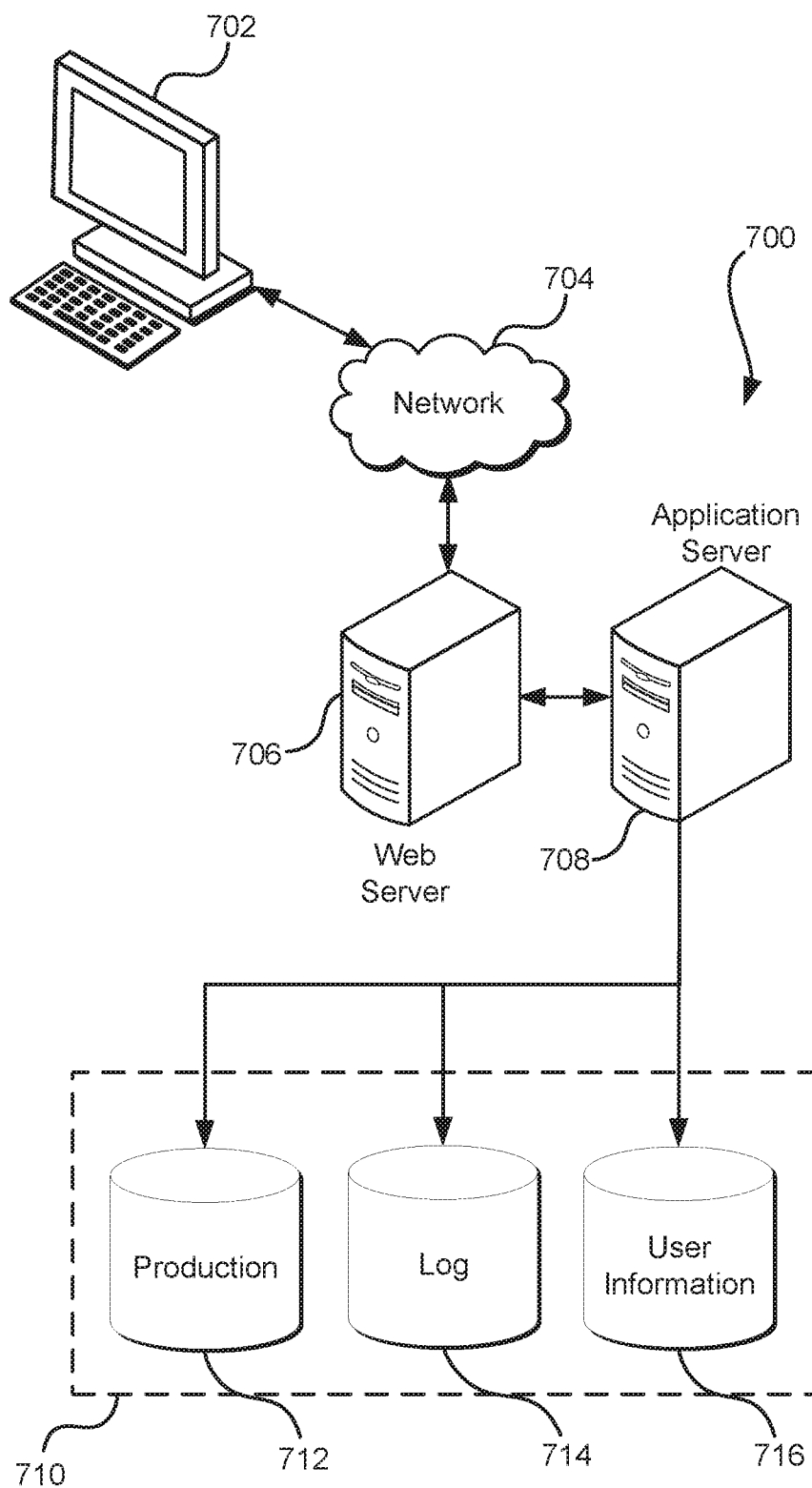
FIG. 7 illustrates a system in which various embodiments can be implemented.

FIG. 7 illustrates aspects of an example system 700 for implementing aspects in accordance with an embodiment. As will be appreciated, although a web-based system is used for purposes of explanation, different systems may be used, as appropriate, to implement various embodiments. In an embodiment, the system includes an electronic client device 702, which includes any appropriate device operable to send and/or receive requests, messages, or information over an appropriate network 704 and convey information back to a user of the device. Examples of such client devices include personal computers, cellular or other mobile phones, handheld messaging devices, laptop computers, tablet computers, set-top boxes, personal data assistants, embedded computer systems, electronic book readers, and the like. In an embodiment, the network includes any appropriate network, including an intranet, the Internet, a cellular network, a local area network, a satellite network or any other such network and/or combination thereof and components used for such a system depend at least in part upon the type of network and/or system selected. Many protocols and components for communicating via such a network are well known and will not be discussed herein in detail. In an embodiment, communication over the network is enabled by wired and/or wireless connections and combinations thereof. In an embodiment, the network includes the Internet and/or other publicly-addressable communications network, as the system includes a web server 706 for receiving requests and serving content in response thereto, although for other networks an alternative device serving a similar purpose could be used as would be apparent to one of ordinary skill in the art.

In an embodiment, the illustrative system includes at least one application server 708 and a data store 710 and it should be understood that there can be several application servers, layers or other elements, processes or components, which may be chained or otherwise configured, which can interact to perform tasks such as obtaining data from an appropriate data store. Servers, in an embodiment, are implemented as hardware devices, virtual computer systems, programming modules being executed on a computer system, and/or other devices configured with hardware and/or software to receive and respond to communications (e.g., web service application programming interface (API) requests) over a network. As used herein, unless otherwise stated or clear from context, the term "data store" refers to any device or combination of devices capable of storing, accessing and retrieving data, which may include any combination and number of data servers, databases, data storage devices and data storage media, in any standard, distributed, virtual or clustered system. Data stores, in an embodiment, communicate with block-level and/or object level interfaces. The application server can include any appropriate hardware, software and firmware for integrating with the data store as needed to execute aspects of one or more applications for the client device, handling some or all of the data access and business logic for an application.

In an embodiment, the application server provides access control services in cooperation with the data store and generates content including, but not limited to, text, graphics, audio, video and/or other content that is provided to a user associated with the client device by the web server in the form of HyperText Markup Language ("HTML"), Extensible Markup Language ("XML"), JavaScript, Cascading Style Sheets ("CSS"), JavaScript Object Notation (JSON), and/or another appropriate client-side or other structured language. Content transferred to a client device, in an embodiment, is processed by the client device to provide the content in one or more forms including, but not limited to, forms that are perceptible to the user audibly, visually and/or through other senses. The handling of all requests and responses, as well as the delivery of content between the client device 702 and the application server 708, in an embodiment, is handled by the web server using PHP: Hypertext Preprocessor ("PHP"), Python, Ruby, Perl, Java, HTML, XML, JSON, and/or another appropriate server-side structured language in this example. In an embodiment, operations described herein as being performed by a single device are performed collectively by multiple devices that form a distributed and/or virtual system.

The data store 710, in an embodiment, includes several separate data tables, databases, data documents, dynamic data storage schemes and/or other data storage mechanisms and media for storing data relating to a particular aspect of the present disclosure. In an embodiment, the data store illustrated includes mechanisms for storing production data 712 and user information 716, which are used to serve content for the production side. The data store also is shown to include a mechanism for storing log data 714, which is used, in an embodiment, for reporting, computing resource management, analysis or other such purposes. In an embodiment, other aspects such as page image information and access rights information (e.g., access control policies or other encodings of permissions) are stored in the data store in any of the above listed mechanisms as appropriate or in additional mechanisms in the data store 710.

The data store 710, in an embodiment, is operable, through logic associated therewith, to receive instructions from the application server 708 and obtain, update or otherwise process data in response thereto and the application server 708 provides static, dynamic, or a combination of static and dynamic data in response to the received instructions. In an embodiment, dynamic data, such as data used in web logs (blogs), shopping applications, news services, and other such applications are generated by server-side structured languages as described herein or are provided by a content management system ("CMS") operating on, or under the control of, the application server. In an embodiment, a user, through a device operated by the user, submits a search request for a certain type of item. In this example, the data store accesses the user information to verify the identity of the user, accesses the catalog detail information to obtain information about items of that type, and returns the information to the user, such as in a results listing on a web page that the user views via a browser on the user device 702. Continuing with example, information for a particular item of interest is viewed in a dedicated page or window of the browser. It should be noted, however, that embodiments of the present disclosure are not necessarily limited to the context of web pages, but are more generally applicable to processing requests in general, where the requests are not necessarily requests for content. Example requests include requests to manage and/or interact with computing resources hosted by the system 700 and/or another system, such as for launching, terminating, deleting, modifying, reading, and/or otherwise accessing such computing resources.

In an embodiment, each server typically includes an operating system that provides executable program instructions for the general administration and operation of that server and includes a computer-readable storage medium (e.g., a hard disk, random access memory, read only memory, etc.) storing instructions (which may be referred to as computer-executable instructions) that, if executed (i.e., as a result of being executed) by a processor of the server, cause or otherwise allow the server to perform its intended functions.

The system 700, in an embodiment, is a distributed and/or virtual computing system utilizing several computer systems and components that are interconnected via communication links (e.g., transmission control protocol (TCP) connections and/or transport layer security (TLS) or other cryptographically protected communication sessions), using one or more computer networks or direct connections. However, it will be appreciated by those of ordinary skill in the art that such a system could operate in a system having fewer or a greater number of components than are illustrated in FIG. 7. Thus, the depiction of the system 700 in FIG. 7 should be taken as being illustrative in nature and not limiting to the scope of the disclosure.

The various embodiments further can be implemented in a wide variety of operating environments, which in some cases can include one or more user computers, computing devices or processing devices which can be used to operate any of a number of applications. In an embodiment, user or client devices include any of a number of computers, such as desktop, laptop or tablet computers running a standard operating system, as well as cellular (mobile), wireless and handheld devices running mobile software and capable of supporting a number of networking and messaging protocols and such a system also includes a number of workstations running any of a variety of commercially-available operating systems and other known applications for purposes such as development and database management. In an embodiment, these devices also include other electronic devices, such as dummy terminals, thin-clients, gaming systems and other devices capable of communicating via a network, and virtual devices such as virtual machines, hypervisors, software containers utilizing operating-system level virtualization and other virtual devices or non-virtual devices supporting virtualization capable of communicating via a network.

In an embodiment, a system utilizes at least one network that would be familiar to those skilled in the art for supporting communications using any of a variety of commercially-available protocols, such as Transmission Control Protocol/Internet Protocol ("TCP/IP"), User Datagram Protocol ("UDP"), protocols operating in various layers of the Open System Interconnection ("OSI") model, File Transfer Protocol ("FTP"), Universal Plug and Play ("UpnP"), Network File System ("NFS"), Common Internet File System ("CIFS") and other protocols. The network, in an embodiment, is a local area network, a wide-area network, a virtual private network, the Internet, an intranet, an extranet, a public switched telephone network, an infrared network, a wireless network, a satellite network, and any combination thereof. In an embodiment, a connection-oriented protocol is used to communicate between network endpoints such that the connection-oriented protocol (sometimes called a connection-based protocol) is capable of transmitting data in an ordered stream. In an embodiment, a connection-oriented protocol can be reliable or unreliable. For example, the TCP protocol is a reliable connection-oriented protocol. Asynchronous Transfer Mode ("ATM") and Frame Relay are unreliable connection-oriented protocols. Connection-oriented protocols are in contrast to packet-oriented protocols such as UDP that transmit packets without a guaranteed ordering.

In an embodiment, the system utilizes a web server that run one or more of a variety of server or mid-tier applications, including Hypertext Transfer Protocol ("HTTP") servers, FTP servers, Common Gateway Interface ("CGI") servers, data servers, Java servers, Apache servers, and business application servers. In an embodiment, the one or more servers are also capable of executing programs or scripts in response to requests from user devices, such as by executing one or more web applications that are implemented as one or more scripts or programs written in any programming language, such as Java®, C, C# or C++, or any scripting language, such as Ruby, PHP, Perl, Python or TCL, as well as combinations thereof. In an embodiment, the one or more servers also include database servers, including without limitation those commercially available from Oracle °, Microsoft °, Sybase °, and IBM® as well as open-source servers such as MySQL, Postgres, SQLite, MongoDB, and any other server capable of storing, retrieving, and accessing structured or unstructured data. In an embodiment, a database server includes table-based servers, document-based servers, unstructured servers, relational servers, non-relational servers, or combinations of these and/or other database servers.

In an embodiment, the system includes a variety of data stores and other memory and storage media as discussed above which can reside in a variety of locations, such as on a storage medium local to (and/or resident in) one or more of the computers or remote from any or all of the computers across the network. In an embodiment, the information resides in a storage-area network ("SAN") familiar to those skilled in the art and, similarly, any necessary files for performing the functions attributed to the computers, servers or other network devices are stored locally and/or remotely, as appropriate. In an embodiment where a system includes computerized devices, each such device can include hardware elements that are electrically coupled via a bus, the elements including, for example, at least one central processing unit ("CPU" or "processor"), at least one input device (e.g., a mouse, keyboard, controller, touch screen, or keypad), at least one output device (e.g., a display device, printer, or speaker), at least one storage device such as disk drives, optical storage devices, and solid-state storage devices such as random access memory ("RAM") or read-only memory ("ROM"), as well as removable media devices, memory cards, flash cards, etc., and various combinations thereof.

In an embodiment, such a device also includes a computer-readable storage media reader, a communications device (e.g., a modem, a network card (wireless or wired), an infrared communication device, etc.), and working memory as described above where the computer-readable storage media reader is connected with, or configured to receive, a computer-readable storage medium, representing remote, local, fixed, and/or removable storage devices as well as storage media for temporarily and/or more permanently containing, storing, transmitting, and retrieving computer-readable information. In an embodiment, the system and various devices also typically include a number of software applications, modules, services, or other elements located within at least one working memory device, including an operating system and application programs, such as a client application or web browser. In an embodiment, customized hardware is used and/or particular elements are implemented in hardware, software (including portable software, such as applets), or both. In an embodiment, connections to other computing devices such as network input/output devices are employed.

In an embodiment, storage media and computer readable media for containing code, or portions of code, include any appropriate media known or used in the art, including storage media and communication media, such as, but not limited to, volatile and non-volatile, removable and non-removable media implemented in any method or technology for storage and/or transmission of information such as computer readable instructions, data structures, program modules or other data, including RAM, ROM, Electrically Erasable Programmable Read-Only Memory ("EEPROM"), flash memory or other memory technology, Compact Disc Read-Only Memory ("CD-ROM"), digital versatile disk (DVD) or other optical storage, magnetic cassettes, magnetic tape, magnetic disk storage or other magnetic storage devices or any other medium which can be used to store the desired information and which can be accessed by the system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the invention to the specific form or forms disclosed, but on the contrary, the intention is to cover all modifications, alternative constructions, and equivalents falling within the spirit and scope of the invention, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. Similarly, use of the term "or" is to be construed to mean "and/or" unless contradicted explicitly or by context. The terms "comprising," "having," "including," and "containing" are to be construed as open-ended terms (i.e., meaning "including, but not limited to,") unless otherwise noted. The term "connected," when unmodified and referring to physical connections, is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. The use of the term "set" (e.g., "a set of items") or "subset" unless otherwise noted or contradicted by context, is to be construed as a nonempty collection comprising one or more members. Further, unless otherwise noted or contradicted by context, the term "subset" of a corresponding set does not necessarily denote a proper subset of the corresponding set, but the subset and the corresponding set may be equal.

Conjunctive language, such as phrases of the form "at least one of A, B, and C," or "at least one of A, B and C," (i.e., the same phrase with or without the Oxford comma) unless specifically stated otherwise or otherwise clearly contradicted by context, is otherwise understood with the context as used in general to present that an item, term, etc., may be either A or B or C, any nonempty subset of the set of A and B and C, or any set not contradicted by context or otherwise excluded that contains at least one A, at least one B, or at least one C. For instance, in the illustrative example of a set having three members, the conjunctive phrases "at least one of A, B, and C" and "at least one of A, B and C" refer to any of the following sets: {A}, {B}, {C}, {A, B}, {A, C}, {B, C}, {A, B, C}, and, if not contradicted explicitly or by context, any set having {A}, {B}, and/or {C} as a subset (e.g., sets with multiple "A"). Thus, such conjunctive language is not generally intended to imply that certain embodiments require at least one of A, at least one of B and at least one of C each to be present. Similarly, phrases such as "at least one of A, B, or C" and "at least one of A, B or C" refer to the same as "at least one of A, B, and C" and "at least one of A, B and C" refer to any of the following sets: {A}, {B}, {C}, {A, B}, {A, C}, {B, C}, {A, B, C}, unless differing meaning is explicitly stated or clear from context. In addition, unless otherwise noted or contradicted by context, the term "plurality" indicates a state of being plural (e.g., "a plurality of items" indicates multiple items). The number of items in a plurality is at least two, but can be more when so indicated either explicitly or by context.

Operations of processes described herein can be performed in any suitable order unless otherwise indicated herein or otherwise clearly contradicted by context. In an embodiment, a process such as those processes described herein (or variations and/or combinations thereof) is performed under the control of one or more computer systems configured with executable instructions and is implemented as code (e.g., executable instructions, one or more computer programs or one or more applications) executing collectively on one or more processors, by hardware or combinations thereof. In an embodiment, the code is stored on a computer-readable storage medium, for example, in the form of a computer program comprising a plurality of instructions executable by one or more processors. In an embodiment, a computer-readable storage medium is a non-transitory computer-readable storage medium that excludes transitory signals (e.g., a propagating transient electric or electromagnetic transmission) but includes non-transitory data storage circuitry (e.g., buffers, cache, and queues) within transceivers of transitory signals. In an embodiment, code (e.g., executable code or source code) is stored on a set of one or more non-transitory computer-readable storage media having stored thereon executable instructions that, when executed (i.e., as a result of being executed) by one or more processors of a computer system, cause the computer system to perform operations described herein. The set of non-transitory computer-readable storage media, in an embodiment, comprises multiple non-transitory computer-readable storage media and one or more of individual non-transitory storage media of the multiple non-transitory computer-readable storage media lack all of the code while the multiple non-transitory computer-readable storage media collectively store all of the code. In an embodiment, the executable instructions are executed such that different instructions are executed by different processors—for example, a non-transitory computer-readable storage medium store instructions and a main CPU execute some of the instructions while a graphics processor unit executes other instructions. In an embodiment, different components of a computer system have separate processors and different processors execute different subsets of the instructions.

Accordingly, in an embodiment, computer systems are configured to implement one or more services that singly or collectively perform operations of processes described herein and such computer systems are configured with applicable hardware and/or software that enable the performance of the operations. Further, a computer system that implement an embodiment of the present disclosure is a single device and, in another embodiment, is a distributed computer systems comprising multiple devices that operate differently such that the distributed computer system performs the operations described herein and such that a single device does not perform all operations.

The use of any and all examples, or exemplary language (e.g., "such as") provided herein, is intended merely to better illuminate embodiments of the invention and does not pose a limitation on the scope of the invention unless otherwise claimed. No language in the specification should be construed as indicating any non-claimed element as essential to the practice of the invention.

Embodiments of this disclosure are described herein, including the best mode known to the inventors for carrying out the invention. Variations of those embodiments may become apparent to those of ordinary skill in the art upon reading the foregoing description. The inventors expect skilled artisans to employ such variations as appropriate and the inventors intend for embodiments of the present disclosure to be practiced otherwise than as specifically described herein. Accordingly, the scope of the present disclosure includes all modifications and equivalents of the subject matter recited in the claims appended hereto as permitted by applicable law. Moreover, any combination of the above-described elements in all possible variations thereof is encompassed by the scope of the present disclosure unless otherwise indicated herein or otherwise clearly contradicted by context.

All references, including publications, patent applications, and patents, cited herein are hereby incorporated by reference to the same extent as if each reference were individually and specifically indicated to be incorporated by reference and were set forth in its entirety herein.

What is claimed is:

1. A computer-implemented method, comprising:
obtaining a request to provision a first account of a first directory within a service provider network, the request specifying:
credential information of a second account of a second directory within an on-premises network of a customer of the service provider; and
an address of a domain name system (DNS) server associated with the on-premises network;
as a result of validating the address of the DNS server, creating a remote domains entry in the service provider network usable to route directory requests to the second directory;
creating the first account in the first directory;
causing the first directory to operate as a proxy to the second directory by at least:
providing, to the first account, access to the credential information of the second account; and
creating, in the first account, conditional forwarding information to cause directory requests to the first directory to be made to the second directory using the credential information;
obtaining a second request at the first directory to access a computing resource on the service provider network;
forwarding the second request and the credential information to the second directory within the on-premises network; and
obtaining a response, from the second directory within the on-premises network, indicating whether to grant access to the resource.

2. The computer-implemented method of claim 1, further comprising:
generating, in a DNS server of the service provider network, a conditional forwarder; and
providing the conditional forwarding information to the conditional forwarder to cause the conditional forwarder to transmit directory requests to the first directory to the second directory.

3. The computer-implemented method of claim 1, further comprising:
obtaining a request to delete the first account;
deleting the first account; and
deleting the conditional forwarding information to terminate a connection from the first directory to the second directory.

4. The computer-implemented method of claim 1, further comprising:
validating a set of DNS servers of the second directory, wherein Internet Protocol addresses of the set of DNS servers are provided in the request; and
as a result of the set of DNS servers being validated, causing the directory requests to be made to the second directory through the set of DNS servers.

5. A system, comprising:
one or more processors; and
memory storing computer-executable instructions that, upon execution, cause the system to:
generate, in response to a request, a first account of a first directory within a first network;
obtain credential information of a second account of a second directory within a second network;
validate an address of a domain name system (DNS) server associated with the second network; and
as a result of validating the address, cause the first directory to operate as a proxy to the second directory by at least causing the system to:
create a remote domains entry in the first network, the entry corresponding to the second network and usable to route directory requests to the second directory;
update the first account to include the credential information of the second directory; and
cause requests directed to the first directory to be submitted to the second directory using the credential information, wherein the first directory lacks access to one or more policies for authenticating the requests.

6. The system of claim 5, wherein the computer-executable instructions further cause the one or more processors to create, in the first account, conditional forwarding information to cause directory requests to the first directory to be made to the second directory using the credential information.

7. The system of claim 5, wherein:
the request specifies the credential information of the second account of the second directory; and
the credential information of the second account is obtained from the request.

8. The system of claim 5, wherein the second network is an on-premises network of a requestor that submitted the request.

9. The system of claim 5, wherein the computer-executable instructions further cause the one or more processors to:
obtain a second request to delete the first account; and
delete the first account to terminate access to the second directory.

10. The system of claim 5, wherein the computer-executable instructions further cause the one or more processors to:
generate, within each DNS server of a set of DNS servers provisioned within the first directory, a conditional forwarder; and
provide, to the conditional forwarder, the credential information to cause the conditional forwarder to be usable to access the second directory.

11. The system of claim 5, wherein the computer-executable instructions further cause the one or more processors to:
validate a set of DNS servers of the second directory; and
as a result of the set of DNS servers being validated, cause directory requests to be made to the second directory through the set of DNS servers.

12. The system of claim 5, wherein the computer-executable instructions further cause the one or more processors to:
obtain a second request to update a set of DNS servers of the second directory;
validate the set of DNS servers; and
generate a conditional forwarder to cause the second directory to be accessible using the updated set of DNS servers.

13. A non-transitory computer-readable storage medium comprising executable instructions that, as a result of being executed by one or more processors of a computer system, cause the computer system to at least:
obtain a request to generate a first account of a first directory within a first network;
generate the first account;
obtain credential information of a second account of a second directory within a second network;
validate the address of a domain name system (DNS) server associated with the second network; and
establish the first directory as a proxy to the second directory by at least causing the computer system to:
create a remote domains entry in the first network, the entry corresponding to the second network and usable to route directory requests to the second directory;
update the first account to include the credential information to cause the first account to be used to access the second directory;
cause one or more directory requests to the first directory to be forwarded to the second directory using the credential information; and
obtain one or more authentication decisions to the one or more directory requests indicating whether the one or more requests were successfully authenticated.

14. The non-transitory computer-readable storage medium of claim 13, wherein the instructions further cause the computer system to:
generate, within a DNS server of the first directory, a conditional forwarder; and
provide the credential information to the conditional forwarder, thereby causing the second directory to be accessible via the conditional forwarder.

15. The non-transitory computer-readable storage medium of claim 13, wherein the instructions further cause the computer system to:
validate, in response to a second request to update a set of DNS servers of the second directory, the set of DNS servers; and
generate a conditional forwarder to cause the second directory to be accessible using the updated set of DNS servers.

16. The non-transitory computer-readable storage medium of claim 13, wherein the instructions further cause the computer system to create, in the first account, conditional forwarding information to cause directory requests to the first directory to be made to the second directory using the credential information.

17. The non-transitory computer-readable storage medium of claim 13, wherein the credential information of the second account is obtained from the request.

18. The non-transitory computer-readable storage medium of claim 13, wherein the second network is an on-premises network of a requestor that submitted the request.

19. The non-transitory computer-readable storage medium of claim 13, wherein the instructions further cause the computer system to:
obtain a second request to delete the first account;
remove the credential information of the second account from the first directory; and
delete the first account to terminate access to the second directory.

20. The non-transitory computer-readable storage medium of claim 13, wherein the instructions further cause the computer system to:
validate a set of DNS servers of the second directory; and
cause directory requests to be made to the second directory through the set of DNS servers.

* * * * *